(12) United States Patent
Shim et al.

(10) Patent No.: US 9,264,817 B2
(45) Date of Patent: Feb. 16, 2016

(54) CONTENT PROCESSING APPARATUS AND METHOD USING SOUND

(71) Applicant: Samsung Electronics Co., Ltd., Suwon-si (KR)

(72) Inventors: Seung-seop Shim, Anyang-si (KR); Kyong-ha Park, Suwon-si (KR); Hyun-su Hong, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 333 days.

(21) Appl. No.: 13/799,267

(22) Filed: Mar. 13, 2013

(65) Prior Publication Data

US 2014/0064499 A1   Mar. 6, 2014

(30) Foreign Application Priority Data

Aug. 31, 2012  (KR) .......................... 10-2012-0096396

(51) Int. Cl.
*H04R 23/00* (2006.01)
*H04B 11/00* (2006.01)
*H04N 21/258* (2011.01)
*H04N 21/422* (2011.01)
*H04N 21/436* (2011.01)
*H04N 21/442* (2011.01)
*H04L 12/28* (2006.01)

(52) U.S. Cl.
CPC ................ *H04R 23/00* (2013.01); *H04B 11/00* (2013.01); *H04N 21/25841* (2013.01); *H04N 21/42203* (2013.01); *H04N 21/43615* (2013.01); *H04N 21/44231* (2013.01); *H04L 2012/2849* (2013.01)

(58) Field of Classification Search
CPC ............. H04B 11/00; H04N 21/43615; H04N 21/44231; H04N 21/44203; H04R 23/00; H04R 29/00; H04R 29/001; H04R 3/04; H04R 3/12; H04R 3/00; H04R 3/002

USPC ........ 381/58, 77, 1, 2, 306, 307, 303, 95, 96, 381/59; 700/94
See application file for complete search history.

(56) References Cited

U.S. PATENT DOCUMENTS

| | | | | |
|---|---|---|---|---|
| 7,394,366 | B2 * | 7/2008 | Moquin et al. ................ | 340/540 |
| 2006/0136544 | A1 * | 6/2006 | Atsmon et al. ................ | 709/200 |
| 2010/0110837 | A1 * | 5/2010 | Jung et al. ..................... | 367/137 |
| 2011/0283334 | A1 * | 11/2011 | Choi ................... | G06F 3/04883 |
| | | | | 725/148 |
| 2012/0084131 | A1 * | 4/2012 | Bergel et al. ............... | 705/14.26 |
| 2012/0128154 | A1 | 5/2012 | Ran | |
| 2012/0159340 | A1 | 6/2012 | Bae et al. | |
| 2013/0108071 | A1 * | 5/2013 | Huang et al. .................... | 381/77 |

FOREIGN PATENT DOCUMENTS

| | | |
|---|---|---|
| EP | 1786145 | 5/2007 |
| GB | 2499494 | 8/2013 |
| WO | 2010/050700 | 5/2010 |

OTHER PUBLICATIONS

Extended European Search Report dated Nov. 6, 2013 in European Patent Application No. 13161332.5.

* cited by examiner

*Primary Examiner* — Vivian Chin
*Assistant Examiner* — David Ton
(74) *Attorney, Agent, or Firm* — Staas & Halsey LLP (57) ABSTRACT

A content processing apparatus using sound includes a sound processor configured to generate acoustic sound for a locality check when an event in which locality check is to be executed is generated, a speaker configured to output the acoustic sound, a microphone configured to receive response sound output from an external apparatus which receives the acoustic sound, and a controller configured to determine the external apparatus which outputs the response sound as a peripheral apparatus.

15 Claims, 11 Drawing Sheets

CONTENT PROCESSING APPARATUS AND METHOD USING SOUND

CROSS-REFERENCE TO RELATED APPLICATIONS

This application claims the priority benefit of Korean Patent Application No. 10-2012-0096396, filed on Aug. 31, 2012 in the Korean Intellectual Property Office, the disclosure of which is incorporated herein by reference in its entirety.

BACKGROUND

1. Field

The following description relates to a content processing apparatus and method, and more particularly, to an apparatus and method for checking locality using sound, and processing content.

2. Description of the Related Art

When users transmit and receive personal content or paid content and store or watch a corresponding content, a locality is checked using round trip time/time to live (RTT/TTL) required in Digital Transmission Content Protection (DTCP) or High-bandwidth Digital Content Protection (HDCP) and a user's confirmation is needed.

As one example, when a mobile phone, in which Digital Living Network Alliance (DLNA) is implemented, is wirelessly connected to a television (TV), if a user transmits content of the mobile phone to the TV, the TV displays a screen to ask whether or not to accept the content. The asking whether or not to accept the content is for security of the wireless connection. That is, corresponding information may be transmitted to neighboring houses regardless of an intention of the user who has transmitted the content. However, even when the screen to ask whether or not to accept the content is displayed, the personal content or paid content may be executed in the neighboring houses when neighbors mistakenly or intentionally accept the reception of the content.

Further, the screen to ask whether or not to accept the content displays a complicated technical description and a legal issue description, and the user selects the content with reference to the descriptions. Therefore, the user may have difficulty understanding the descriptions and reject the content, even when the content has been normally received, and thus, the user may find it difficult to transmit the content from the mobile phone to the TV.

For the convenience of the user, the manufacturers may set "reception acceptance" as a default when the user receives content through a TV, but the issue for security and privacy still exists. Therefore, there is a need for content transmission technology which promotes the convenience of the user and does not cause an issue for security and privacy.

SUMMARY

Additional aspects and/or advantages will be set forth in part in the description which follows and, in part, will be apparent from the description, or may be learned by practice of the invention.

One or more exemplary embodiments may overcome the above disadvantages and other disadvantages not described above. However, it is understood that one or more exemplary embodiment are not required to overcome the disadvantages described above, and may not overcome any of the problems described above.

The following description relates to a content processing apparatus and method using sound capable of ensuring security and promoting convenience of a user.

According to an aspect of an exemplary embodiment, a content processing apparatus may include: a sound processor configured to generate acoustic sound for locality check when an event in which locality check is to be executed is generated; a speaker configured to output the acoustic sound; a microphone configured to receive response sound output from an external apparatus which receives the acoustic sound; and a controller configured to determine the external apparatus which outputs the response sound as a peripheral apparatus.

The content processing apparatus may further include a storage unit in which data for the locality check is stored. The sound processor may mix the data with preset basic sound to generate the acoustic sound when a content sharing command is received.

The basic sound may include music sound or sound of an inaudible frequency band.

The content processing apparatus may further include an input unit configured to receive the content sharing command. The controller may control the sound processor and the speaker to determine that the event is generated when the content sharing command is received and to output the acoustic sound.

The controller may communicate with the peripheral apparatus to transmit or receive content when the number of peripheral apparatuses is determined to be one.

The content processing apparatus may further include a display unit configured to display a list for a plurality of peripheral apparatuses. When one peripheral apparatus is selected in the list, the controller may communicate with the selected peripheral apparatus to transmit or receive content.

When acoustic sound output from other apparatuses is received through the microphone, the controller may control the sound processor and the speaker to detect data mixed with the received acoustic sound and output response sound to the other apparatuses using the detected data.

According to an aspect of an exemplary embodiment, a content processing method may include: generating acoustic sound for locality check when an event in which locality check is to be executed is generated; outputting the acoustic sound; receiving response sound output from an external apparatus which receives the acoustic sound; and determining the external apparatus which outputs the response sound as a peripheral apparatus.

The content processing method may further include storing data for the locality check and the generating acoustic sound may include mixing the data with preset basic sound to generate the acoustic sound when a content sharing command is received.

The basic sound may include music sound or sound of an inaudible frequency band.

The content processing method may further include receiving the content sharing command and determining that the event is generated when the content sharing command is received.

The content processing method may further include communicating with the peripheral apparatus to transmit or receive content when the number of peripheral apparatuses is determined to be one.

The content processing method may further include displaying a list for a plurality of peripheral apparatuses and communicating with a selected peripheral apparatus to transmit or receive content when one peripheral apparatus is selected in the list.

The content processing method may further include, when acoustic sound output from other apparatuses is received, detecting data mixed with the received acoustic sound and outputting response sound to the other apparatuses using the detected data.

According to the above-described exemplary embodiments, content is processed using sound to ensure security and promote the convenience of a user.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail because they would obscure the exemplary embodiments with unnecessary detail.

Figure 1:
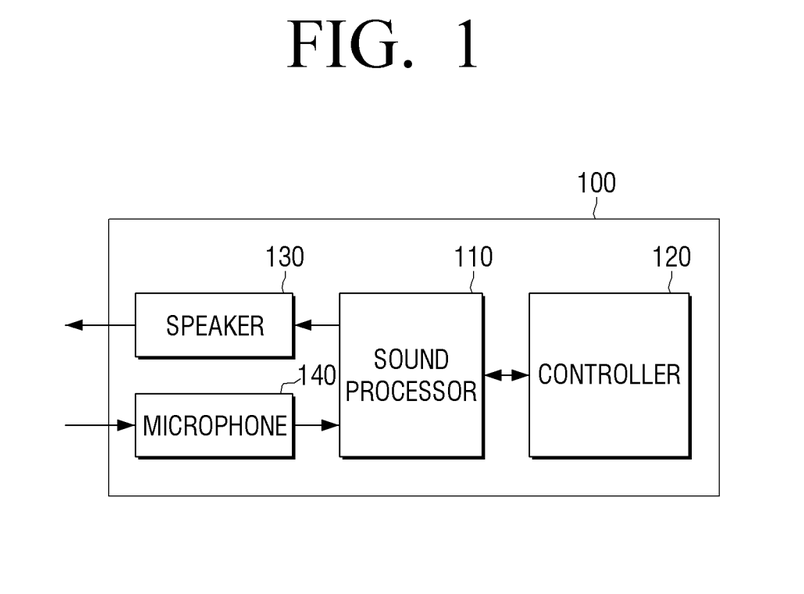
FIG. 1 is a block diagram illustrating a content processing apparatus according to an exemplary embodiment.

FIG. 1 is a block diagram illustrating a content processing apparatus according to an exemplary embodiment.

Referring to FIG. 1, a content processing apparatus 100 includes a sound processor 110, a controller 120, a speaker 130, and a microphone 140. The sound processor 110 generates acoustic sound for a locality check when an event in which a locality check is to be executed is generated. The locality check may check peripheral reception apparatuses or check whether or not to enable reception. The acoustic sound may include a sound wave for the locality check. The sound processor 110 converts digital content to be transmitted to a determined peripheral apparatus into a content sound signal which is an analog signal when the peripheral apparatus is determined as a result of the locality check. Alternatively, the sound processor 110 converts a digital content signal into an analog signal and generates a mixing sound signal mixed with other sound such as music sound. Further, because the received sound signal is an analog signal, the signal processor 110 converts the received sound signal into a digital signal.

The speaker 130 outputs the acoustic sound generated in the sound processor 110. The sound processor 110 outputs a content sound signal or a mixing sound signal to transmit content when the locality check is executed.

The microphone 140 receives response sound output from an external apparatus which receives the acoustic sound. When the response sound is received, the microphone may receive unique identification (ID) information of the external apparatus.

The controller 120 controls at least the sound processor 110, the speaker 130, and the microphone 140 of the content processing apparatus 100. The controller 120 determines the external apparatus which outputs the response sound as a peripheral apparatus. The peripheral apparatus is a reception-side content processing apparatus which will transmit content. The controller 120 communicates with the peripheral apparatus to transmit or receive content when the number of peripheral apparatuses is determined to be one and communicates with a peripheral apparatus selected by a user to transmit or receive content when the number of peripheral apparatuses is determined to be a plural number.

Hereinafter, a configuration of the content processing apparatus 100 will be described in detail.

Figure 2:
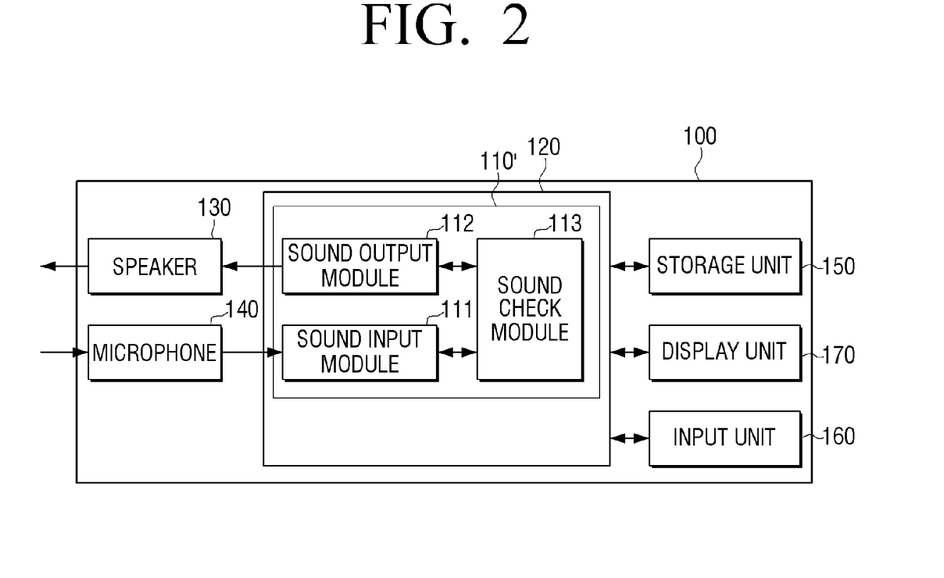
FIG. 2 is a detailed block diagram illustrating a content processing apparatus according to an exemplary embodiment.

FIG. 2 is a detailed block diagram of a content processing apparatus according to an exemplary embodiment.

Referring to FIG. 2, the content processing apparatus 100 may further include a storage unit 150, an input unit 160, and a display unit 170. Further, although the sound processor 110 is configured to be separated from the controller 120 in FIG. 1, a sound processor 110' may be configured to be included in the controller 120 as shown in FIG. 2.

The storage unit 150 stores data including information for the locality check. For example, the storage unit 150 may include read only memories (ROMs), random access memories (RAMs), or detachable/mountable memory cards (for example, secure digital (SD) cards or memory cards). Further, the storage unit 150 may include non-volatile memories, volatile memories, hard disc drives (HDDs), or solid state drives (SDDs).

The input unit 160 receives various kinds of commands for operating the content processing apparatus 100, including a content sharing command from the user. For example, the input unit 160 may include a button (not shown) formed in the outside of the content processing apparatus 100, a touch screen (not shown) formed integrally with the display unit 170, an image capturing unit (not shown) configured to capture a motion of a user's gesture, and a microphone configured to receive a user's voice.

The display unit 170 may display a screen corresponding to the user's command and display a list for peripheral apparatuses when a plurality of peripheral apparatuses exist as a result of the locality check. For example, the display unit 170 may be implemented with various display units such as liquid crystal display (LCD) panels, plasma display panels (PDPs), organic light emitting diodes (OLEDs), vacuum fluorescent displays (VFDs), field emission displays (FEDs), or electro luminescence displays (ELDs).

The sound processor 110' includes a sound input module 111, a sound output module 112, and a sound check module 113. The sound check module 113 encrypts and generates locality check data for a locality check of an external apparatus, or receives and decrypts the encrypted locality check data for a locality check transmitted from the external apparatus. The sound check module 113 generates response data for the locality check and transmits the response data to the sound output module 112. The response data may include unique information (such as an ID, electronic serial number (ESN), serial number, or address, for example) of the content processing apparatus.

The sound output module 112 converts the encrypted locality check data generated in the sound check module 113 into an analog sound signal. The sound output module 112 outputs acoustic sound mixed with basic sound of a specific frequency band to the outside through the speaker 130. The basic sound may include music sound, sound having an audible frequency of a specific band, or sound having an inaudible frequency band. The sound output module 112 may output the response sound for the locality check result to the outside through the speaker 130.

The sound input module 111 divides an encrypted analog sound signal from acoustic sound received from the microphone 140. The sound input module 111 converts the divided encrypted analog sound signal into an encrypted digital signal. The sound input module 111 transmits the converted digital signal to the sound check module 113 and the sound check module 113 receives and decrypts the encrypted digital signal and confirms information required for a locality check. Alternatively, the sound output module 112 receives the response sound output from the peripheral apparatus through the speaker 130 and processes the received response sound.

The controller 120 determines that the event in which the locality check is to be executed is generated when the content sharing command is input through the input unit 160. Therefore, the controller 120 may control the sound processor 110' and the speaker 130 to output the acoustic sound. The controller 120 may control the content processing apparatus 100 to communicate with a selected peripheral apparatus and transmit or receive content when the display unit 170 displays a list for the plurality of peripheral apparatuses and a user selects one peripheral apparatus among the list. Alternatively, the controller 120 may control the sound processor 110' and the speaker 130 to detect data mixed to input acoustic sound and to output response sound using the detected data when acoustic sound output from other apparatuses is input through the microphone 140.

As described above, the sound processor 110' may include a portion of the controller 120. Alternatively, the sound processor 110' may be implemented with hardware, which is a physical configuration, or with software.

The procedure of processing the acoustic sound has been described from the block diagram of the content processing apparatus. Hereinafter, a method of generating the acoustic sound will be described.

Figure 3:
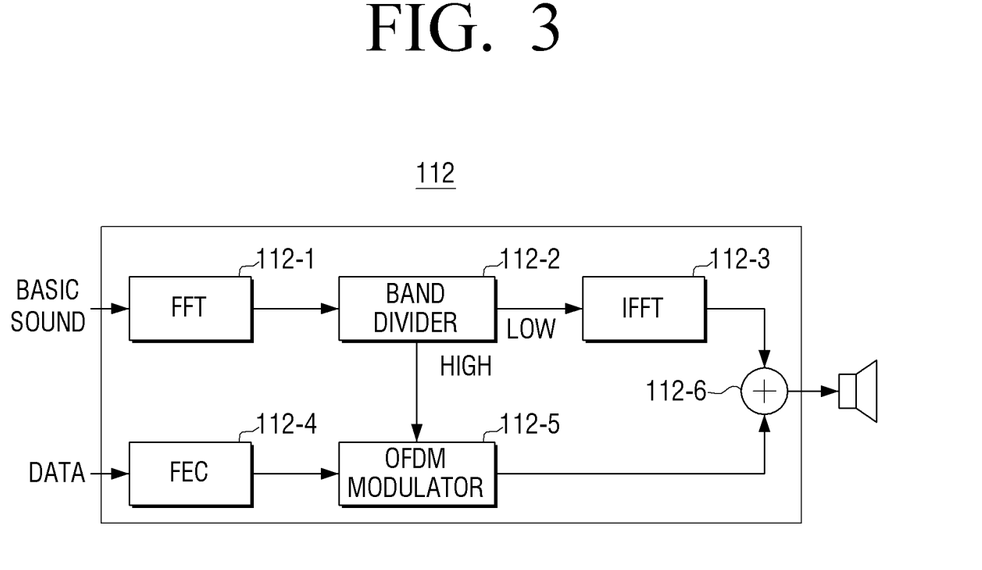
FIG. 3 is a view explaining a method of generating acoustic sound mixed with basic sound according to an exemplary embodiment.

FIG. 3 is a view explaining a method of generating acoustic sound mixed with basic sound according to an exemplary embodiment.

Referring to FIG. 3, the sound output module 112 includes a fast Fourier transform (FFT) unit 112-1, a band divider 112-2, an inverse FFT (IFFT) unit 112-3, a forward error correction (FEC) unit 112-4, an orthogonal frequency division multiplex (OFDM) modulator 112-5, and a mixer 112-6. The FFT unit 112-1 performs FFT on an audio signal, such as music sound or specific band sound. The band divider 112-2 divides the fast Fourier transformed audio signal into a high-frequency component HIGH and a low-frequency component LOW. The low-frequency component is transmitted to the IFFT unit 112-3 and the high-frequency component is transmitted to the OFDM modulator 112-5. The IFFT unit 112-3 performs IFFT on an audio signal from which a high-frequency component is removed.

The FEC unit 112-4 FEC-encodes input digital data and outputs a FEC-encoded result. The OFED modulator 112-5 performs OFDM on digital data encoded according to the high-frequency component. The sound signal processed in the OFDM modulator 112-5 has a spectral envelop similar to the high-frequency component. The mixer 112-6 mixes the audio signal processed in the IFFT unit 112-3 and the sound signal processed in the OFDM modulator 112-5 to generate acoustic sound. The generated acoustic sound is output through the speaker 130.

The above-described method of generating acoustic sound is one exemplary embodiment, and the acoustic sound may be generated through other various methods.

Figure 4:
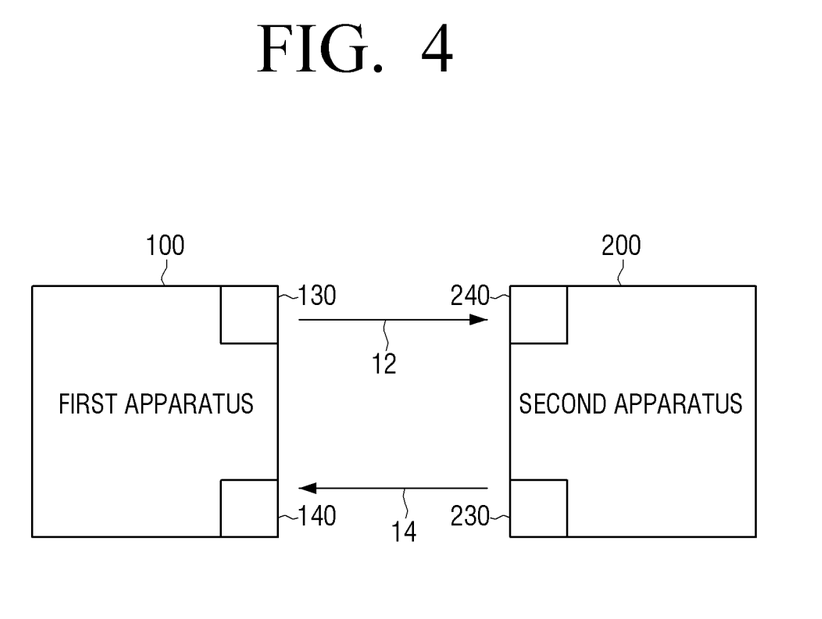
FIG. 4 is a view explaining a content transmission method according to an exemplary embodiment.

FIG. 4 is a view explaining a content transmission method according to an exemplary embodiment.

Referring to FIG. 4, a first apparatus 100 is a transmission-side content processing apparatus and a second apparatus 200 is a reception-side content processing apparatus. The user selects a start menu of a locality check of the first apparatus 100. The first apparatus 100 generates acoustic sound 12 for a locality check. The generated acoustic sound 12 is output through a speaker 130 of the first apparatus 100.

A microphone 240 of the second apparatus 200 receives the acoustic sound 12 for locality check output from the first apparatus 100. The acoustic sound input through the microphone 240 is signal-processed through the sound input module and extracted as encrypted data for locality check, and the extracted data is transmitted to a sound check module. In a normal state, a sound check module of the second apparatus 200 maintains a state which can receive data for locality check. The sound check module of the second apparatus 200 decrypts the input data and confirms whether or not data for locality check exists. A confirmed result is encrypted and signal-processed through a sound output module of the second apparatus 200 and therefore, response sound 14 is output through a speaker 230 of the second apparatus 200. The microphone 140 of the first apparatus 100 receives the response sound 14 output from the second apparatus. A sound input module and a sound check module of the first apparatus 100 confirms the response sound to terminate the locality check procedure. The normal termination of the locality check procedure means acceptance for data reception of the second apparatus 200. When the first apparatus 100 does not receive the response sound or the normal locality check is not executed, the first apparatus 100 may notify failure of the user through a display unit thereof. Alternatively, the first apparatus 100 may display a screen to ask reconfirmation.

Data transmission procedure through the above-described locality check process will be described.

Figure 5:
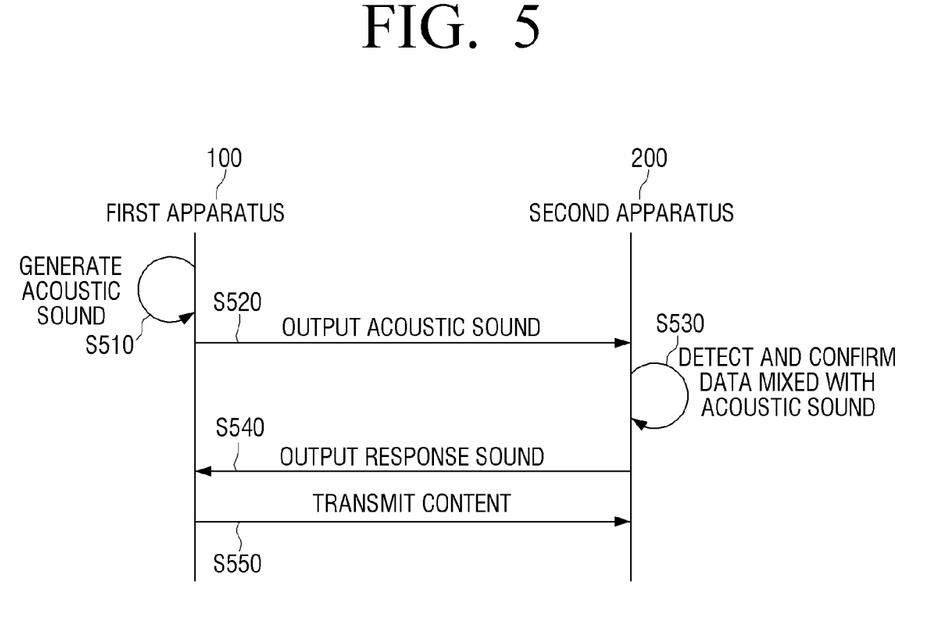
FIG. 5 is a control sequence diagram illustrating a content transmission method according to an exemplary embodiment.

FIG. 5 is a control sequence diagram illustrating a content transmission method according to an exemplary embodiment.

Referring to FIG. 5, the first apparatus 100 generates acoustic sound (operation S510). The generated acoustic sound is output through the speaker of the first apparatus 100 (operation S520). The second apparatus 200 receives the output acoustic sound and detects and confirms data for locality check mixed with the acoustic sound (operation S530). The second apparatus 200 outputs response sound (operation S540). When the first apparatus 100 receives the response sound and the locality check procedure is normally terminated, the data reception of the second apparatus 200 is regarded to be accepted. Therefore, the procedure of inquiring additional reception acceptance by the user is not necessary. The first apparatus 100 transmits content (operation S550). The detailed description thereof has been made and will be omitted.

Figure 6:
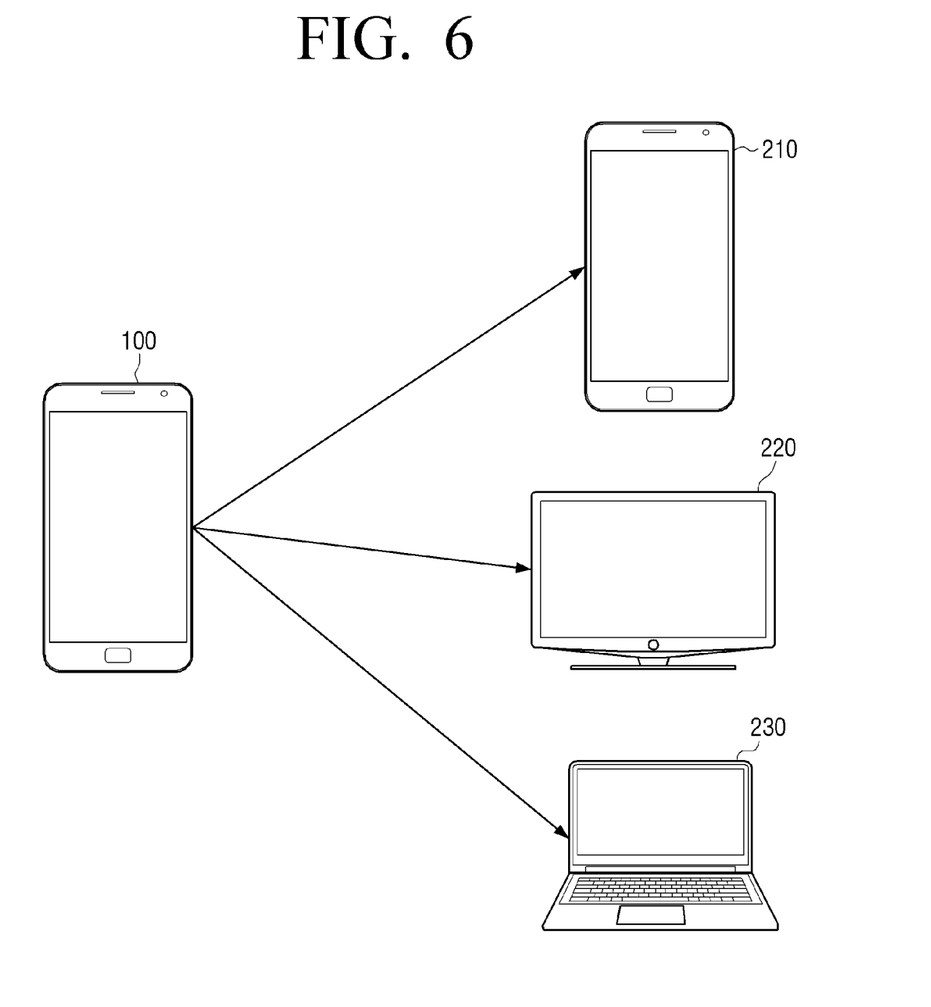
FIG. 6 is a view illustrating connection to a plurality of reception-side content processing apparatuses according to an exemplary embodiment.

FIG. 6 is a view illustrating connection to a plurality of reception-side content processing apparatuses according to an exemplary embodiment.

Referring to FIG. 6, a content processing apparatus 100 and a plurality of devices 210, 220, and 230 exist to share content. The content processing apparatus 100 and the respective devices 210, 220, and 230 are not necessary to form a specific network. However, the content is shared using sound and thus the content processing apparatus 100 and the plurality of devices 210, 220, and 230 have to be disposed within a fixed distance (such as 5 m, for example). The predetermined distance may be a distance in which sound output from the content processing apparatus 100 can be recognized as sound in the respective devices 210, 220, and 230. When an intensity of the sound output from the content processing apparatus 100 is large, the predetermined distance may be increased.

When a content sharing function (or a locality check function) is selected in the content processing apparatus 100, the content processing apparatus 100 outputs encrypted acoustic sound for a locality check. The content sharing function is a function to share and reproduce content between a plurality of apparatuses. Specifically, the content sharing function may be a DLNA function.

When performing the content sharing function, the content processing apparatus 100 may be operated as a digital multimedia server (DMS), which provides content, or as a digital multimedia renderer (DMR) or a digital multimedia player (DMP), which reproduces content provided from the other apparatuses.

When the content sharing function is selected in the content processing apparatus 100 of FIG. 6, the content processing apparatus 100 outputs the encrypted acoustic sound signal for a locality check. Each of the plurality of devices 210, 220, and 230 receives the encrypted acoustic signal and outputs response sound. The response sound may include unique information of each of the plurality of devices 210, 220, and 230. The content processing apparatus 100 receives the response sound output from the respective devices 210, 220, and 230. Because there are the plurality of devices which output the response sound, the content processing apparatus 100 displays devices which can share the content in the display unit to be selected by the user. A detailed user interface (UI) screen will be described below.

Figure 7:
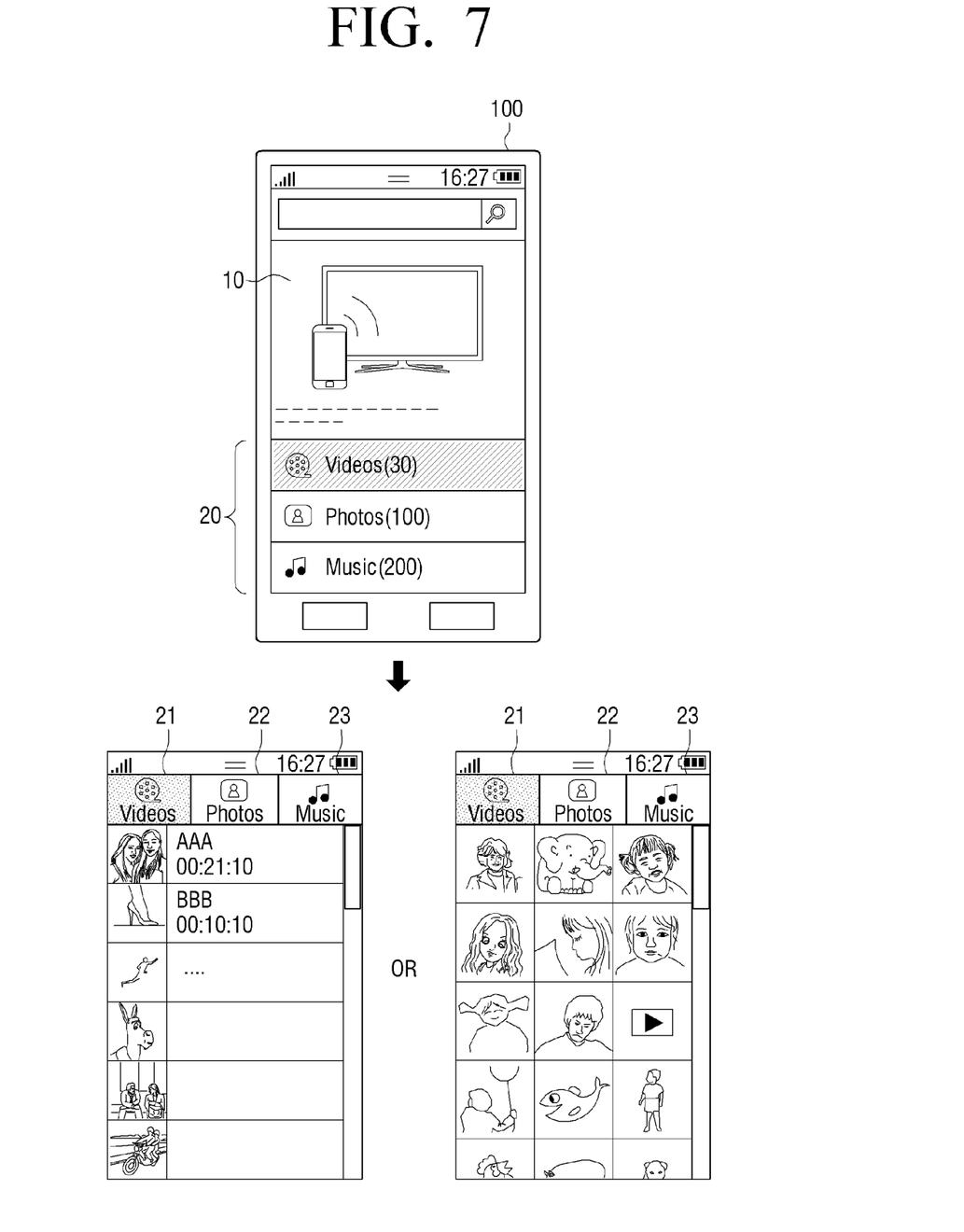
FIGS. 7 to 9 are views explaining user interface (UI) screens of a content processing apparatus according to an exemplary embodiment.
Figure 8:
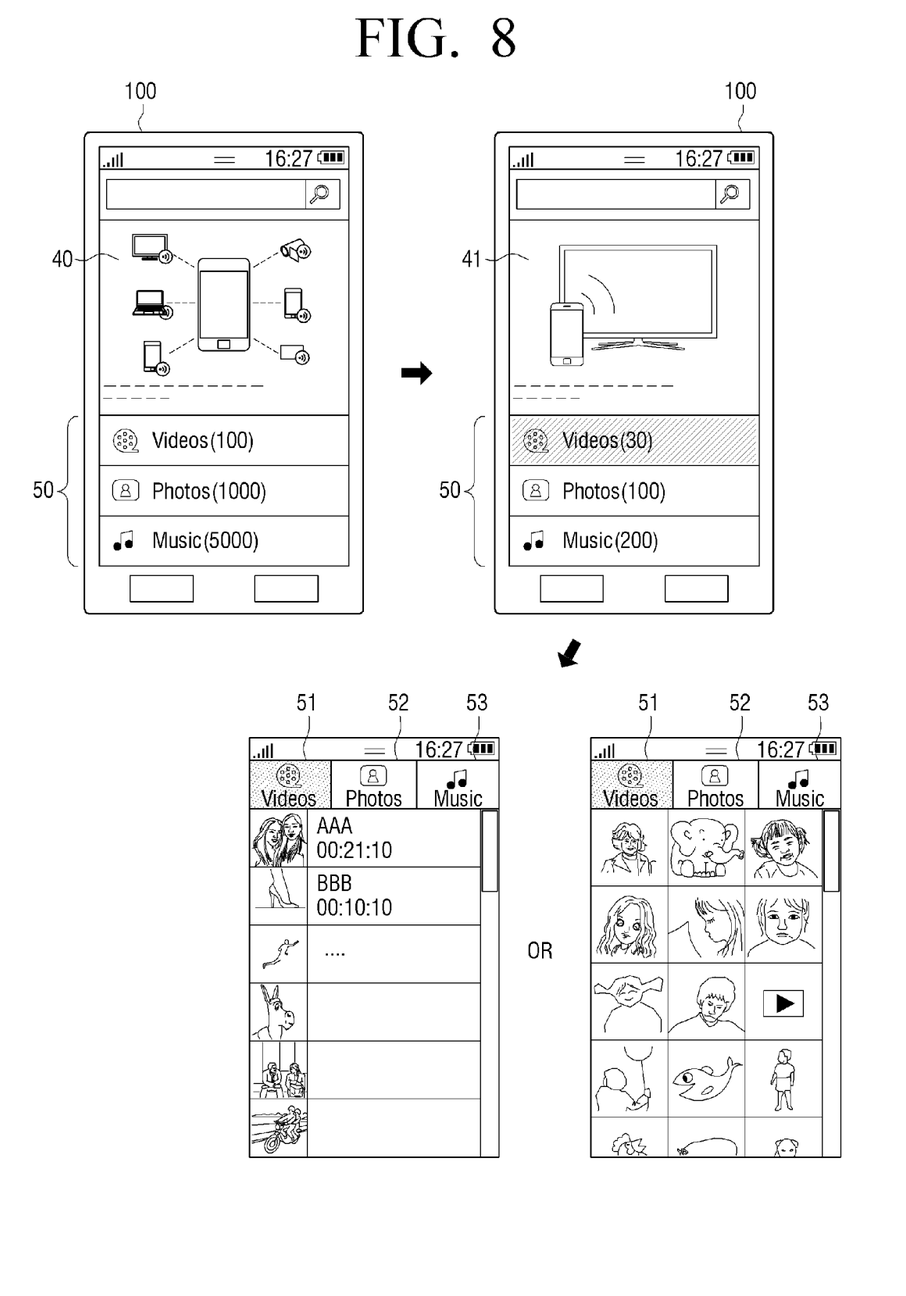
Figure 9:
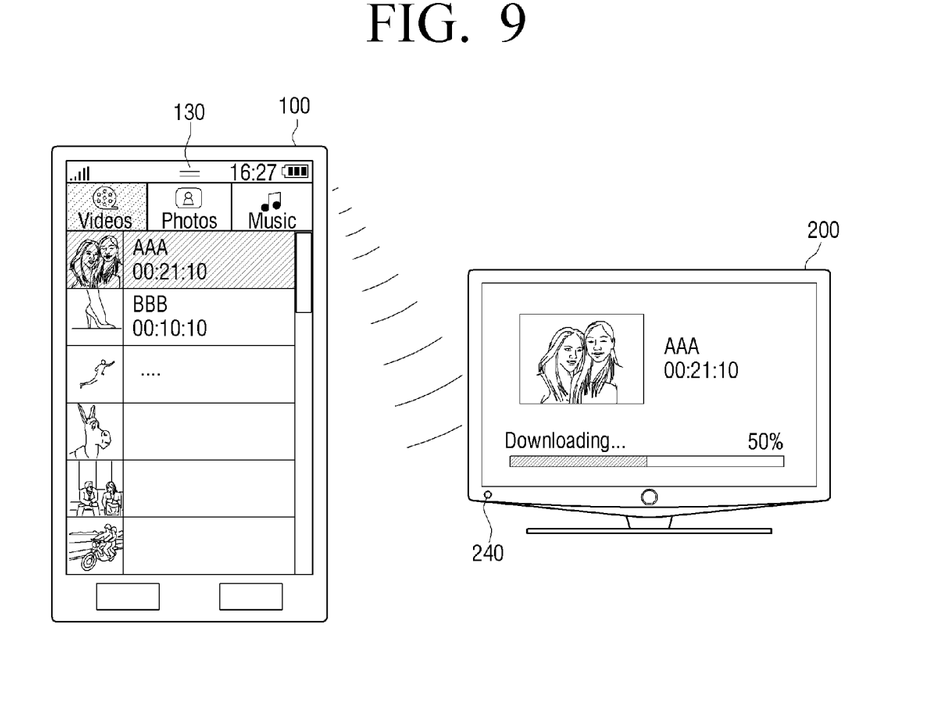

FIGS. 7 to 9 are views explaining UI screens of content processing apparatuses according to an exemplary embodiment. FIGS. 7 to 9 illustrate UI screens for content transmission after a locality check between content processing apparatuses is successfully terminated.

FIG. 7 is a view illustrating a UI screen of a transmission-side content processing apparatus when a number of reception-side content processing apparatuses is determined to be one.

As shown in FIG. 7, when a locality check is successfully performed, a transmission-side content processing apparatus 100 executes a content transmission mode without conformation for content acceptance of the user. An image indicating the content transmission mode may be displayed in an upper portion 10 of a screen of the transmission-side content processing apparatus 100. The upper portion 10 displaying the screen indicating content transmission mode may display an image in which the user can intuitively see an actual apparatus using transmission-side unique information, reception-side unique information, and the like. Additionally, the upper portion 10 of the screen may display information for the reception-side content processing apparatus.

Contents to be transmitted are classified and displayed in a lower portion 20 of a screen in the transmission-side content processing apparatus 100. Lists for a video folder, a photo folder, and a music folder are displayed in FIG. 7. The user selects the video folder. The transmission-side content processing apparatus 100 displays a detailed content list of the video folder which has been stored in response to a user's selection command.

The detailed content list may be display in a list type or a thumbnail-view type. A menu which can allow the selection of a video folder 21, a photo folder 22, and a music folder 23 may be displayed in an upper portion of a screen. When the user selects the photo folder 22 or the music folder 23, the display unit may display a detailed content list corresponding to the selected folder. A detailed content list for the video folder is displayed in FIG. 7. The user may select at least one item of content among the detailed content list. When the user selects content and then selects a transmission menu, the selected content is transmitted to the reception-side content processing apparatus.

FIG. 8 is a view explaining a UI screen of a transmission-side content processing apparatus when a plurality of reception-side content processing apparatuses exist.

Referring to FIG. 8, a plurality of reception-side content processing apparatuses which can transmit content may be displayed in an upper portion 40 of a screen in a transmission-side content processing apparatus 100. The plurality of reception-side content processing apparatuses may be determined using unique information for apparatuses input together with the response sound to the reception-side content processing apparatus 100. An image in which the user can intuitively see an actual apparatus using the unique information and the like may be displayed in the upper portion 40 of the screen in the display unit. Further, the reception-side content processing apparatuses may be displayed in a list type. A list in which contents such as a video folder, a photo folder, and a music folder, for example, are classified may be displayed in a lower portion 50 of the screen.

When the user selects one of the plurality of reception-side content processing apparatuses displayed in the upper portion of the screen, the screen in the upper portion of the transmission-side content processing apparatus 100 is switched to a screen 41 of a content transmission mode which transmits content to the selected reception-side content processing apparatus. When the user selects the video folder among the classified list, a detailed content list corresponding to the selected video folder may be displayed in a list type or a thumbnail-view type. The detailed content list may be display in a list type or a thumbnail-view type. A menu which can allow the selection of a video folder 51, a photo folder 52, and a music folder 53 may be displayed in an upper portion of a screen. When the user selects at least one item of content and a transmission menu, the selected content is transmitted to the selected reception-side content processing apparatus. A detailed description of the operation is the same as that of FIG. 7 and will be omitted.

FIG. 9 is a view illustrating a UI screen in which a selected content is transmitted.

Referring to FIG. 9, the user selects a video content AAA in the transmission-side content processing apparatus 100 and selects a transmission menu. The content selected by the user's transmission menu selection is transmitted to a reception-side content processing apparatus 200. The content may be also transmitted using sound. A content sound signal processed in the transmission-side content processing apparatus 100 or a mixing sound signal mixed with basic sound is output through a speaker 130 of the transmission-side content processing apparatus 100.

The output content sound signal or mixing sound signal is input through a microphone 240 of a reception-side content processing apparatus 200. The sound output from the transmission-side content processing apparatus 100 may be input to the plurality of reception-side content processing apparatuses. However, the output content sound signal or mixing sound signal may be recognized as effective sound only in a reception-side content processing apparatus 200 selected by the user using unique information of the reception-side content processing apparatuses 100.

At this time, a display unit of the selected reception-side content processing apparatus may display information of content which is being received or transmission progress.

Next, a content processing method will be described.

Figure 10:
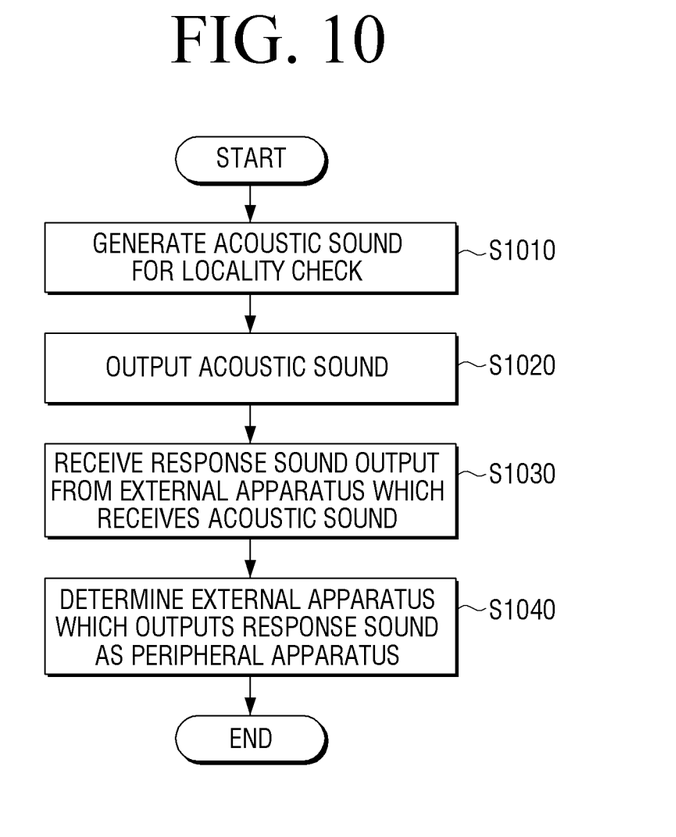
FIG. 10 is a flowchart illustrating a content processing method in a transmission side according to an exemplary embodiment.

FIG. 10 is a flowchart illustrating a content processing method in a transmission-side according to an exemplary embodiment.

Referring to FIG. 10, a transmission-side content processing apparatus generates acoustic sound for a locality check (operation S1010). When a content sharing command is received from the user, the transmission-side content processing apparatus determines that an event in which a locality check is to be performed is generated and generates the acoustic sound. The transmission-side content processing apparatus mixes data for a locality check with basic sound to generate acoustic sound. The basic sound may be music sound or sound of a specific frequency band.

The transmission-side content processing apparatus outputs the generated acoustic sound (operation S1020). The transmission-side content processing apparatus may receive response sound output from an external apparatus which receives the acoustic sound (operation S1030). The transmission-side content processing apparatus determines the external apparatus which outputs the response sound as a peripheral apparatus (operation S1040).

When the determined peripheral apparatus is one, the transmission-side content processing apparatus may communicate with the peripheral apparatus to transmit or receive content. When the number of peripheral apparatus is determined to be a plural number, the transmission-side content processing apparatus may display the plurality of peripheral apparatuses in a list or a thumbnail image. When the user selects one peripheral apparatus, the transmission-side content processing apparatus may communicate with the selected peripheral apparatus to transmit or receive content.

Figure 11:
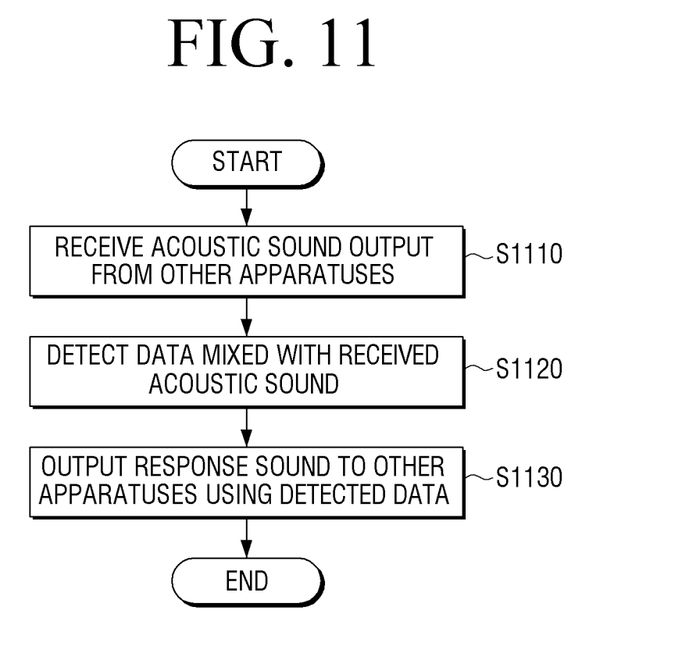
FIG. 11 is a flowchart illustrating a content processing method in a reception side according to an exemplary embodiment.

FIG. 11 is a flowchart illustrating a content processing method in a reception side according to an exemplary embodiment.

Referring to FIG. 11, a reception-side content processing apparatus receives acoustic sound output from other apparatuses (operation S1110). The reception-side content processing apparatus detects data for locality check mixed with the received acoustic sound (operation S1120). The reception-side content processing apparatus outputs response sound to the other apparatuses using the detected data (operation S1130). The response sound may include unique information of the reception-side content processing apparatus. The reception-side content processing apparatus which outputs the response sound may be in a reception standby mode. Detailed processing method has been made and will be omitted.

The methods according to the above-described exemplary embodiments may be implemented with software and installed in a display apparatus or a system.

Specifically, according to an exemplary embodiment, a non-transitory computer-readable medium, in which a program for performing, when an event in which locality check is to be performed is generated, generating acoustic sound for a locality check, outputting the acoustic sound, receiving response sound output from an external apparatus which receives the acoustic sound, and determining the external apparatus which outputs the response sound as a peripheral apparatus is stored, is installed. Alternatively, a non-transitory computer-readable medium, in which a program for performing, when acoustic sound output from other apparatuses is received, detecting data mixed with the received acoustic sound and outputting response sound to the other apparatuses using the detected data is stored, may be installed.

The non-transitory computer-readable medium includes a medium which semi-permanently stores data and is readable by an apparatus other than a medium which temporarily stores data such as a resister, a cache, or a memory. Specifically, the above-described various applications or programs may be stored in non-transitory computer-readable media such as compact discs (CDs), digital versatile discs (DVDs), hard discs (HDs), blu-ray discs, universal serial buses (USBs), memory cards, or ROMs and provided. Alternatively, the various applications or programs may be downloaded through a network such as Internet.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A content processing apparatus using sound, comprising:
   a sound processor configured to generate acoustic sound for a locality check when an event in which a locality check is to be executed is generated;
   a speaker configured to output the acoustic sound;
   a microphone configured to receive an output response sound from an external apparatus which receives the acoustic sound;
   a controller configured to determine the external apparatus which outputs the response sound as a peripheral apparatus; and
   a storage unit in which data for the locality check is stored;
   wherein the sound processor mixes the data with preset basic sound to generate the acoustic sound when a content sharing command is received; and
   wherein the sound processor comprises:
   a band divider to divide the preset basic sound into a high band and a low band;
   a forward error correction processor to encode the data with forward error correction;
   an orthogonal frequency division multiplex (OFDM) modulator to modulate both the high band and the encoded data; and
   a mixer to add the low band to an output from the OFDM modulator.

2. The content processing apparatus as claimed in claim 1, wherein the basic sound comprises music sound or sound of an inaudible frequency band.

3. The content processing apparatus as claimed in claim 2, further comprising an input unit configured to receive the content sharing command,
   wherein the controller determines that the event is generated when the content sharing command is received and controls the sound processor and the speaker to output the acoustic sound.

4. The content processing apparatus as claimed in claim 3, wherein the controller communicates with the peripheral apparatus to transmit or receive content when the number of peripheral apparatuses is determined to be one.

5. The content processing apparatus as claimed in claim 3, further comprising a display unit configured to display a list for a plurality of peripheral apparatuses,
   wherein, when one peripheral apparatus is selected in the list, the controller communicates with the selected peripheral apparatus to transmit or receive content.

6. The content processing apparatus as claimed in claim 1, wherein, when output acoustic sound from other apparatuses is received through the microphone, the controller detects data for the locality check mixed with the received acoustic sound and controls the sound processor and the speaker to output response sound to the other apparatuses using the detected data.

7. A content processing method using sound, comprising:
   generating acoustic sound for locality check when an event in which locality check is to be executed is generated by mixing data for the locality check with preset basic sound to generate the acoustic sound when a content sharing command is received;
   outputting the acoustic sound from a content processing apparatus;
   receiving output response sound from an external apparatus which receives the acoustic sound;
   determining the external apparatus which outputs the response sound as a peripheral apparatus;
   storing the data for the locality check;
   dividing the preset basic sound into a high band and low band;
   encoding the data with forward error correction;
   modulating both the high band and the encoded data using orthogonal frequency division multiplex (OFDM) modulation to obtain an OFDM modulated signal;
   adding the low band to the OFDM modulated signal.

8. The content processing method as claimed in claim 7, wherein the basic sound comprises music sound or sound of an inaudible frequency band.

9. The content processing method as claimed in claim 8, further comprising:
   receiving the content sharing command; and
   determining that the event is generated when the content sharing command is received.

10. The content processing method as claimed in claim 9, further comprising communicating with the peripheral apparatus to transmit or receive content when the number of peripheral apparatuses is determined to be one.

11. The content processing method as claimed in claim 9, further comprising:
    displaying a list for a plurality of peripheral apparatuses; and
    communicating with a selected peripheral apparatus to transmit or receive content when one peripheral apparatus is selected in the list.

12. The content processing method as claimed in claim 7, further comprising, when output acoustic sound from other apparatuses is received, detecting data for the locality check mixed with the received acoustic sound and outputting response sound to the other apparatuses using the detected data.

13. A non-transitory computer-readable recording medium storing a program to implement the method of claim 7.

14. A content processing system using sound, the system comprising:
    a transmission-side content processing apparatus comprising:
      a first sound processor configured to generate a locality check sound signal by mixing data for a locality check with preset basic sound to generate the acoustic sound when a content sharing command is received;
      a first speaker configured to output the generated locality check sound signal;
      a first microphone configured to receive an output response sound signal;
      a first controller;
      a storage configured to store the data for the locality check;
      a band divider to divide the preset basic sound into a high band and a low band;
      a forward error correction processor to encode the data with forward error correction;
      an orthogonal frequency division multiplex (OFDM) modulator to modulate both the high band and the encoded data; and
      a mixer to add the low band to an output from the OFDM modulator; and
    a reception-side content processing apparatus comprising:
      a second microphone configured to receive the locality check sound signal;
      a second controller configured to confirm the locality check sound signal;
      a second sound processor configured to generate the output response sound signal; and
      a second speaker configured to output the generated output response sound signal, wherein the first controller is configured to identify the reception-side content processing apparatus based on the output response sound signal.

15. The system of claim 14, wherein the locality check sound signal and the output response sound are generated to be imperceptible to a user of the content processing system.

* * * * *